United States Patent

[11] 3,633,170

[72] Inventor Gardner D. Jones, Jr.
Raleigh, N.C.
[21] Appl. No. 44,680
[22] Filed June 9, 1970
[45] Patented Jan. 4, 1972
[73] Assignee International Business Machines Corporation
Armonk, N.Y.

[54] DIGITAL FILTER AND THRESHOLD CIRCUIT

7 Claims, 5 Drawing Figs.

[52] U.S. Cl. .......... 340/172.5, 325/38 B, 328/163, 332/11 D, 333/70 T

[51] Int. Cl. .......... H03b 1/00

[50] Field of Search .......... 340/172.5; 325/38 B; 328/162, 163, 167; 332/11 R, 11 D; 333/70 T, 18

[56] References Cited

UNITED STATES PATENTS 3,315,171 4/1967 Becker .......... 328/163

*Primary Examiner*—Raulfe B. Zache
*Attorneys*—Hanifin and Jancin and Robert B. Brodie ABSTRACT: In a data receiver binary-coded analog signal samples are applied to the delay element of a digital filter of the transversal-type. The samples are logically combined and weighted to provide a numeric digital output with reference to a threshold without analog reconversion.

INVENTOR
GARDNER D. JONES, JR.

BY Robert Bruce Brodie
ATTORNEY

DIGITAL FILTER AND THRESHOLD CIRCUIT

BACKGROUND OF THE INVENTION

1. Field of the Invention

This invention relates to the delta modulation of analog signals, and, more particularly, to an improved digital filter for recovering the original analog signals from received pulse trains.

2. Description of the Prior Art

In the prior art, delta modulation was originally described in French Pat. No. 932,140 issued on Aug. 10, 1946 (see U.S. Pat. No. 2,629,857, issued on Feb. 24, 1953) by S. van Mierlo, B. Derjavitch, and E. M. Deloraine. In this form of modulation and transmission only the changes in signal amplitude from sampling instant to sampling instant are encoded. In order to determine whether a change has, in fact, occurred between successive samples, a comparison is made between the instant sampled signal amplitude and a threshold. If the sample value exceeds the threshold, then a binary "1" pulse may be generated. If the value is less than or equal to the reference, the binary "0" represents the sampled instant. The threshold comprises the feedback integrated differences between the prior input signal samples and the corresponding instantaneous output. That is, for each instantaneous signal sample magnitude $e_i$, an output signal $e_0$ is encoded such that $e_0=1$ if, $$e_i-\sum_{i=0}^{i-1}e_{i-1}>k$$

and $e_0=0$ if $$e_i-\sum_{i=0}^{i-1}e_{i-1}\leq k$$

It is well known that telephone lines greatly vary in their attenuation and phase shift characteristics. In this regard, any departure from a linear phase versus frequency characteristic distorts received pulses and causes intersymbol interference. In the use of telephone voice channels for high-speed data communications, pulse distortion is more likely to arise from nonlinear phase than from variations in attenuation. It thus becomes desirable to apply corrective means or "equalization" a data keep the pulse distortion within reasonable limits.

The most common approach to "equalizing" a data channel is to place a network at the receiver. The network has an attenuation versus frequency phase characteristic equal to the differences between the actual line and attempts to linearize the phase. th Typically, complex corrective networks were fashioned from passive, reactive components. Disadvantageously, coercive and dielectric materials used in reactive components often changed their magnetic and electric field qualities as a function of age, temperature, and frequency. Consequently, the complex network approach to "equalization" has been fraught with the high cost of "hand crafted" filter design. In this regard, reference may be made to "Reference Data for Radio Engineers," 4th Edition, published by ITT, New York, 1958, for an acute and detailed discussion on "Image Parameter and Root Locus Techniques for the Design of Analog Filters." Lastly, recent advances in circuit miniaturization unfortunately do not lend themselves to wide use of coercive and dielectric material. This is because of the tendency of such materials to be irregularly deposited and because of molecular migration.

The "equalization" of a line may be also thought of as the selective adding and subtracting of the frequency components of a received pulse with compensating phase adjustments being made as a function of "weighting." Restated, each frequency component of a normal and healthy received pulse contributes a predetermined sinusoidal magnitude in a defined phase relation with the other components. Distortion of a signal by the line requires that the relative "weighting" of the components be adjusted.

As was pointed out in "The Use of Digital Circuits in Data Transmissions" by P. J. van Gerwen, 1959, Phillips Technical Review, Volume 30 at pages 71 through 81, the use of tapped delay lines as part of an "equalization filter makes it possible to obtain an attenuation characteristic which has steep sides yet still possesses a linear phase characteristic." Such filters are termed "transversal." They generally include a tapped delay line, a resistive summing network, and a plurality of multiplying elements, each element coupling a preselected tap to the summing network. As may be recalled, the phase angle $\phi$ varies directly as the product of angular frequency $\omega$ and time $t$. If the tap spacings along the delay line are fixed such that for a given delay of T seconds then the phase angle $\phi$ between a component measured at one tap with the signal at another tap is a function of frequency $\omega$. Now, $\omega$ is equal to $2\pi f$. When $f$ is equal to $1/T$ then $\phi$ is equal to $2\pi$ radians. This means that the signal measured at the first tap will be in phase with the signal measured at the second tap. When $f=1/2T$ then $\omega=2\pi T/2T$ or $\pi$ radians. This means that the first harmonic is 180° out of phase at the second tap with respect to the fundamental frequency measured at the first tap. Thus, any variation representable by a summation of harmonically related sine terms can be obtained from a set of symmetrically located pairs of taps with equal multiplier settings.

It is possible by varying the tap spacing and the value of the multiplier term, to be found in the element coupling the tap to the summing circuit, to obtain any shaped variation in phase with reference to the harmonically related terms.

The delay line elements like their complex, passive network counterparts are both numerous, costly, and lossy. These factors lead to the use of digitalized filters. Reference may again be made to the aforementioned van Gerwen article wherein a shift register is substituted for the tapped delay line. Such shift register use is likewise described in IBM Technical Disclosure Bulletin, Volume 11, Number 7, Dec., 1968, at pages 884 to 885. Notice should be taken of the fact that both the multiplication elements and summing networks include tapped resistive and passive reactances.

It is, accordingly, an object of this invention to devise a digital filter of the transversal type having alterable frequency components weighting and summing characteristics. Relatedly, it is desired that the filter be adapted for use with a transmission line as an equalizer especially with pulse-type signals.

It is yet another object that the digital filter minimize the number of resistive and passive reactive impedance elements to enable fabrication using thin-film techniques.

It is still another object that the filter be combinable with a threshold detector and employable as a simplified filter detector in the receiver of a delta-modulation digital data-transmission system.

SUMMARY OF THE INVENTION

The foregoing objects are satisfied in an embodiment in which a pulse train representing the digitally encoded values is applied to an $n$ stage shift register at a cyclic rate. Each of $m$ preselected stages is assigned a corresponding arithmetic weight, $a_i$. A counter in base $b$ having an upper limit of $b^r$ serves as an output-indicating device. A logic arrangement distributes the signal present at preselected ones of the $m$-shifted stages to only those stages of the counter in which the sum of their count capacity $$\Sigma b^q=a_i,$$

, for each selected $a_i$ $q\leq r$. A circuit coupling the counter provides signal indication if the counter magnitude exceeds a reference value.

Illustratively, three of the $m$ shift register stages might have the respective weights of M1=6, M2=3, M3=5. If all three shift register stages contained a bit then 14 would be inserted into the counter. Consequently, during each shift cycle the contents of the register at each of the *m* positions are weighted and summed. This is accomplished, of course, by individually strobing each of the m positions. If that stage contains a bit, a binary number is added to the counter corresponding to the coefficient value of that stage. Significantly, the counter is reset at the end of each shift time. The contents prior to resetting are a digitized version of the filtered input signal and do not require a digital to analog conversion. Lastly, the counter is scalable such that the threshold may be represented by its bit value.

DESCRIPTION OF THE PREFERRED EMBODIMENT

Figure 1:
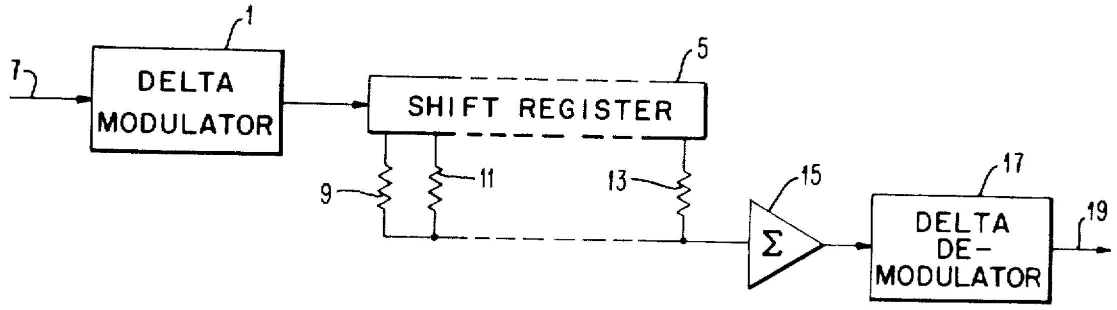
FIG. 1 PRIOR ART
FIG. 1 shows a transversal filter using shift register delay as found in the prior art.

Referring now to FIG. 1, there is shown a transversal filter using shift register delay to be found in the prior art. Typically, such a filter is located in the receiving portion of the digital data-transmission system. An analog signal which is to be filtered is applied on input path 7 to a digital encoder 1. A composite signal is formed at summer 15 by algebraically adding the weighted signals present on resistors 9, 11, and 13. The resistors terminate in corresponding shift register stages at one end, and at a common node at the other end. The composite signal derived from summer 15 is then applied to delta demodulator 17. Examples of delta modulators and demodulators may be found, for example, in "Modulation, Noise and Spectral Analysis" by P. F. Panter, McGraw Hill, 1965, Library of Congress 64–24606 at pages 67–9699. In the shift register transverse filter shown in the van Gerwen reference at page 75 thereof and the IBM Technical Disclosure Bulletin a digital to analog conversion is required when the filter is combined with a decision circuit.

Figure 2:
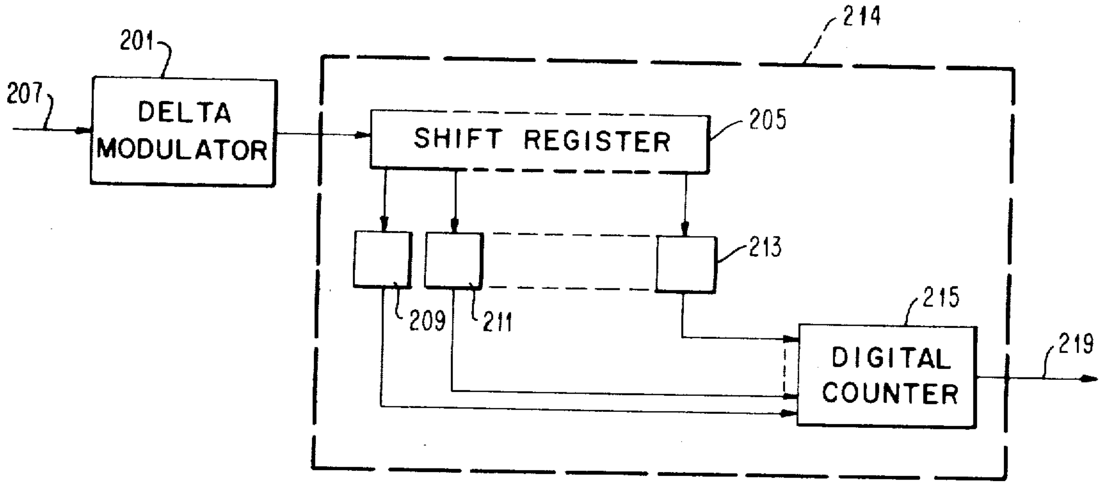
FIG. 2 illustrates the general organization of the transverse filter according to the invention.

Referring now to FIG. 2, there is shown in block diagram form a transversal filter of the shift register type in which the filter output may be used directly to form the decision output.

Delta modulator 201 applies a stream of pulses to shift register 205. Broadly, logic elements 209, 211, and 213 replace the resistive network 9, 11, and 13. Counter 215 replaces the summer 15 and demodulator 17 shown in FIG. 1.

Figure 3:
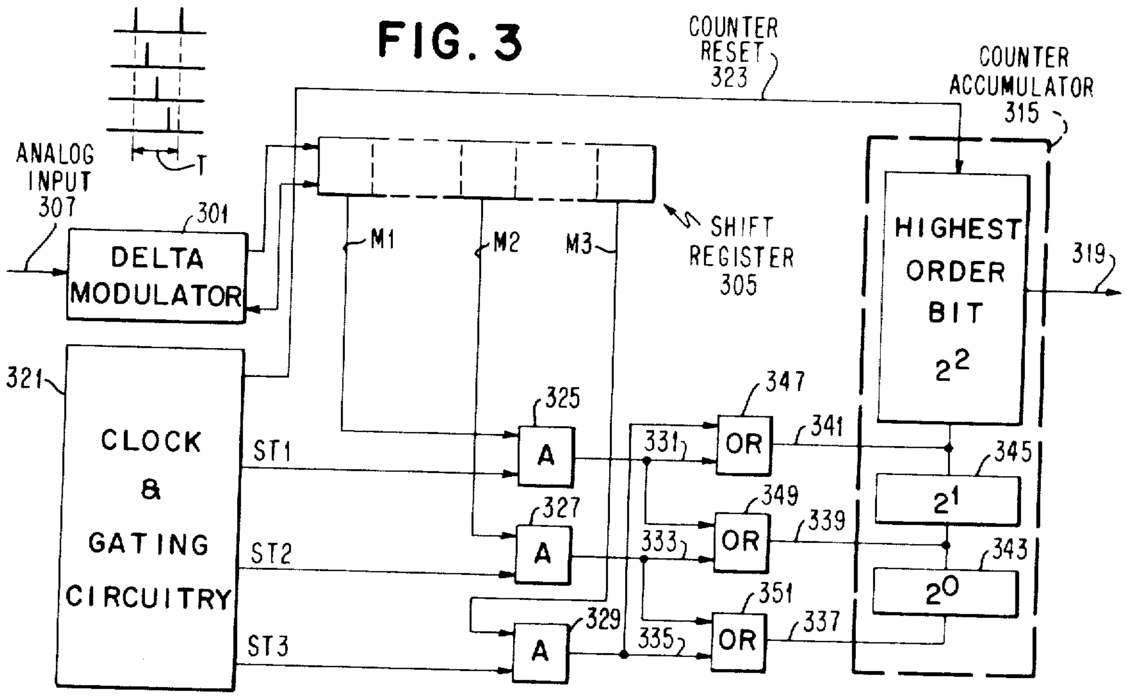
FIG. 3 is a detailed logic diagram of the elements shown in FIG. 2.

Referring now to FIG. 3, there is shown a detailed logic diagram of the filter and decision circuit shown in FIG. 2. Shift register 305 has a preselected *m* of the *n* stages coupled through a logic arrangement 325–341, 347–351 to a counter 315. The cycling of counter 315 and the gating of the signal contents of the *m* stages is controlled by clock and gating circuitry 321. In this regard, counter resetting is accomplished over path 323 while the strobing of the contents of preselected stages M1, M2, and M3 is initiated over corresponding paths ST1, ST2, and ST3.

The logic arrangement includes a plurality of AND-gates 325, 327, 329 and OR-gates 347, 349 and 351. Each OR gate drives a corresponding one of the counter stages. Thus, OR-gate 351 drives the lowest significant counter stage. OR-gate 349 drives the next most significant counter stage. OR-gate 349 drives the 2' counter stage 345 over path 339. Likewise, OR-gate 347 drives the numeral $2^2$ stage over path 341.

Each of the *n* stages of shift 305 is assigned an arithmetic weighting $a_i$, which weighting can be assigned on any predetermined pattern. Illustratively, stage M1 is set at 6, while stage M2 is set at 3, and stage M3 is set at 5. The signal contained in these assigned stages is distributed only to those counter stages whose sum is equal to the arithmetic weighting assigned to the shift register stage. Thus, since M1 is set to 6, it will be distributed to the corresponding OR-gates 347 and 349. These gates drive the $2^2$ and $2^1$ counter stages, respectively. Likewise, shift register stage M2 is set equal to 3. Its signal is distributed to OR-gates 349 and 351. These gates drive the $2^1$ and $2^0$ counter stages, respectively. The signal distribution is accomplished by way of appropriate AND gates. AND-gate 325 terminates shift register stage M1 and the strobe-gating terminal ST1 from clock and gating circuitry 321. AND-gate 327 terminates stage M2 and strobe gate ST2. Lastly, AND-gate 329 terminates stage M3 and strobe terminal ST3.

During an appropriate time interval T, each of the AND gates may be individually turned on so as to gate through the signal contents of the corresponding shift register stages through to the appropriate counter stages. Accordingly, during each shift time, the contents of register 305 at each stage are weighted and summed. This is accomplished by individually strobing each tap position such that if a position contains a bit, the binary number is added to the counter 315 corresponding to the coefficient value for the corresponding shift register stage. As previously mentioned, the binary weighting for the digital values of the shift register stage coefficients are determined by the level at which they are applied to the counter. If all three stages contained a bit, then 14 would be added to counter 315.

Although the input signal has two levels when it is filtered, the result is multilevel. Significantly, the decision as to whether the filtered signal has exceeded a threshold can be determined digitally by ascertaining the binary magnitude of the counter. The counter is scaled such that the threshold is represented by its midvalue. The highest order bit of a counter then serves as the output of the filter-decision function. When the filter is used in the delta-modulated transmission system, the highest order counter bit is, indeed, the digital output data.

Figure 4:
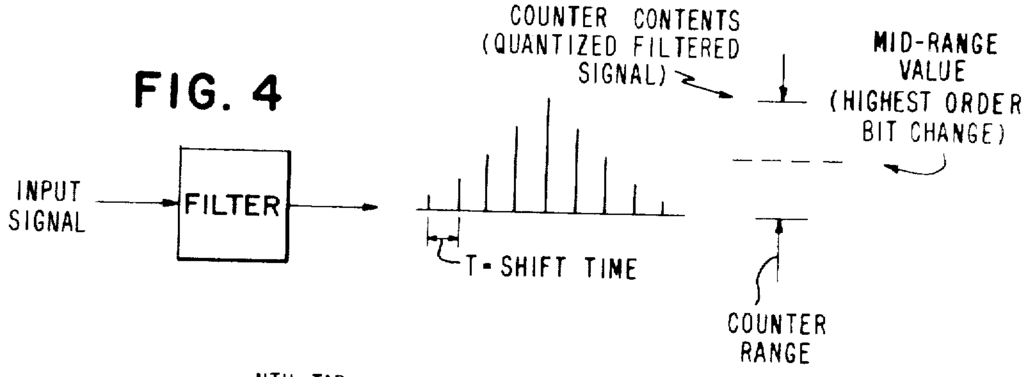
FIG. 4 diagrammatically sets forth the quantized filter signal in relation to the counter range.

Referring now to FIG. 4, there is shown the relationship between the contents of counter 315 and the threshold level. It should be observed that as the contents of the counter progressively are shifted there through in various multiples of shift time T. Consequently, there will be a variation in the counter binary value and the midrange value. The counter is reset to the midrange value at the end of each shift range time.

Figure 5:
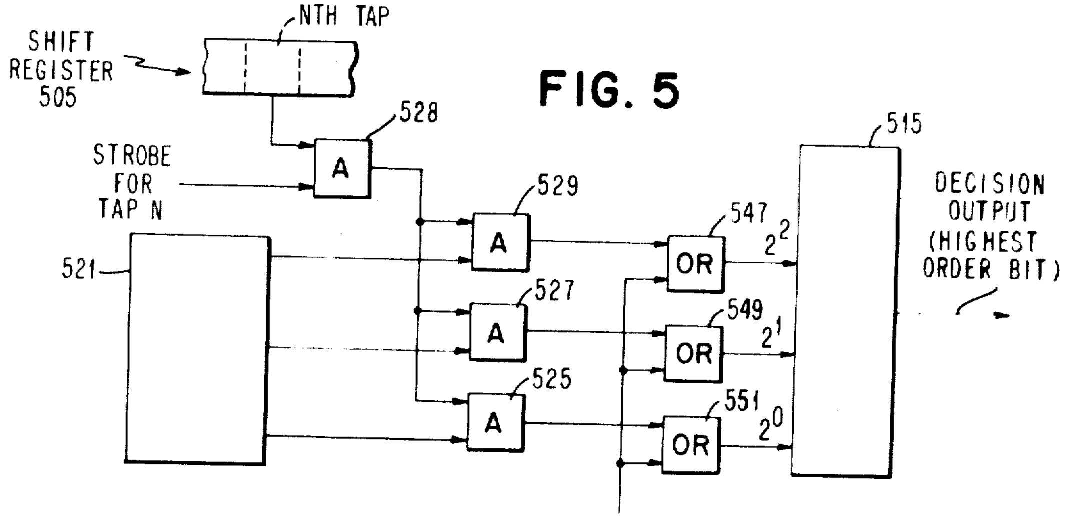
FIG. 5 illustrates the program ability of the filter according to the invention.

Referring now to FIG. 5, there is shown another embodiment of the invention in which clock and gating circuit 321 is replaced by an indexible register whose contents may be altered from time to time by the program of, say, for example, a general purpose digital computer. The arithmetic weighting of the filter can be easily addressed externally since any of the strobe lines coupling AND-gates 525, 527, and 529 can be activated.

While the invention has been particularly shown and described with reference to a preferred embodiment thereof, it will be understood by those skilled in the arts that the foregoing and other changes in form and details may be made therein without departing from the spirit and scope of the invention.

What is claimed is:

1. In a filter of the transversal type in which a series of pulses is applied through a delay element, such as an *n* stage shift register in which a preselected *m* of the *n* stages is assigned a corresponding arithmetic weighting $a_i$, the combination comprising;

means for counting in base *b* to an upper limit of $b^r$; and a logic arrangement for distributing the signal present at preselected ones of the shift register stages to those counter stages the sum of whose count capacity $$\Sigma b^q = a_i,$$

for each selected $a_i$ where $q \leq r$.

2. A digital filter comprising;

an *n* shift stage register in which a preselected *m* of the *n* stages is assigned a corresponding arithmetic weighting $a_i$;

means for applying a pulse train to the shift register;

a counter in base $b$ having an upper limit of $b^r$; and a logic arrangement for distributing the signal present at preselected ones of the $m$ of $n$ shift register stages only to those counter stages the sum of whose count capacity $$\Sigma b^q = a_i$$

for each selected $a_1$ where $q$ is less than or equal to $r$.

3. In a filter of the transversal type in which a series of binary pulses are cyclically applied to an $n$ stage shift register and, further, in which each of $m$ preselected stages is assigned a corresponding arithmetic weight $a_i$, the combination comprising:

a binary counter having $r$ stages;

a logic arrangement for distributing the signal present at preselected ones of the $m$ shift register stages only to those counter stages the sum of whose count capacity $$\Sigma b^q = a_i,$$

for each selected $a_i$, where $q$ is less than or equal to $r$; and means coupled to the binary counter for providing signal indication if the binary signal counter magnitude is greater than a reference value.

4. In a data-transmission system in which only fluctuations in signal amplitude from sampling instant to sampling instant are encoded in binary and further wherein each binary signal represents the fact that the corresponding signal magnitude exceeds the sum of the prior differences between the instant magnitude and a reference, said system comprising:

an $n$-stage shift register; the means for applying successive binary signals to the shift register;

a binary counter;

a logic arrangement for distributing the binary signals present at a preselected $m$ of the $n$ shift register stages to preselected ones of the counter stages; and means coupled to the binary counter means for providing signal indication if the binary counter signal magnitude is greater than a reference value.

5. A digital filter according to claim 2, wherein the logic arrangement includes:

a source of selection signals;

$m$ OR gates coupling corresponding ones of $m$ counter stages where $m$ is less than or equal to $r$;

$m$ AND gates terminating corresponding ones of the $m$ shift register stages as a first input, each AND gate coupling only those counter stages through the associate OR gate, the sum of whose count capacity $$\Sigma b^q = a_i,$$

for each $a_i$, where $q$ is less than or equal to $r$; and means for activating only those AND gates corresponding to the selection signal source.

6. In a data-transmission system including a transmission medium having a nonlinear attenuation versus phase characteristic; means for impressing an analog signal upon the medium; and a receiver coupling said medium; the combination comprising:

means at the receiver responsive to the analog signal for providing a delta modulated equivalence represented by a binary pulse train;

an $n$-stage shift register;

means for applying the binary pulse train to the shift register;

a binary counter;

a logic arrangement responsive to separately coded indicia for distributing the binary pulses present at a preselected $m$ of the $n$ shift register stages to preselected ones of the counter stages; and means coupled to the binary counter for providing signal indication if the binary counter signal magnitude is greater than a reference value, whereby alteration of the logic arrangement by varying the coded indicia effectively provides a linearizing phase characteristic.

7. In a data-transmission system in which only fluctuations in signal amplitude from sampling instant to sampling instant are encoded in binary and further wherein each binary signal represents the fact that the corresponding signal magnitude exceeds the sum of the prior differences between the instant magnitude and a reference; said system comprising:

an N-stage shift register;

means for applying successive binary signals to the shift register;

a weighting circuit having M-input ports; and a logic arrangement responsive to separately coded indicia for distributing the binary signals present at a preselected M of the N shift register stages to preselected and corresponding ones of the M-input ports.

* * * * *